(12) United States Patent
License et al.

(10) Patent No.: US 12,275,283 B2
(45) Date of Patent: Apr. 15, 2025

(54) OPTIMIZED ARCHITECTURE OF A CIVIL ENGINEERING TIRE

(71) Applicant: COMPAGNIE GENERALE DES ETABLISSEMENTS MICHELIN, Clermont-Ferrand (FR)

(72) Inventors: William License, Clermont-Ferrand (FR); François Barbarin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 11 days.

(21) Appl. No.: 18/286,965

(22) PCT Filed: Apr. 11, 2022

(86) PCT No.: PCT/FR2022/050679
§ 371 (c)(1),
(2) Date: Oct. 13, 2023

(87) PCT Pub. No.: WO2022/219277
PCT Pub. Date: Oct. 20, 2022

(65) Prior Publication Data
US 2024/0181811 A1 Jun. 6, 2024

(30) Foreign Application Priority Data
Apr. 15, 2021 (FR) .................... FR2103881

(51) Int. Cl.
*B60C 15/00* (2006.01)
*B60C 9/02* (2006.01)
*B60C 9/04* (2006.01)

(52) U.S. Cl.
CPC .......... *B60C 9/023* (2013.01); *B60C 15/0027* (2013.01); *B60C 2009/0425* (2013.01); *B60C 2200/065* (2013.01)

(58) Field of Classification Search
CPC . B60C 2200/065; B60C 2200/14; B60C 9/02; B60C 9/04; B60C 9/08;
(Continued)

(56) References Cited

U.S. PATENT DOCUMENTS 4,162,698 A 7/1979 Merli et al.
2008/0295946 A1* 12/2008 Kraus ................. B60C 15/0607
152/541

(Continued)

FOREIGN PATENT DOCUMENTS

| FR | 2 366 945 | 5/1978 |
|---|---|---|
| WO | WO 2009/092648 | 7/2009 |
| WO | WO 2018/011507 | 1/2018 |

*Primary Examiner* — Cedrick S Williams
(74) *Attorney, Agent, or Firm* — COZEN O'CONNOR

(57) ABSTRACT

Radial carcass tire for a civil engineering vehicle, having two bead wires (2) of radial height Ht, and carcass reinforcement made of two layers, the first (1) being radially innermost with a radial height Hdc, is anchored in each bead to form a main part (11) and a turn-up (12). The second layer (3) is radially outside the first layer (1). The free end (A) of the turn-up (12) is at a radial distance from the radially outermost point (21) of the bead wire that is at least equal to 1 and at most equal to 2 times Ht. From the end A of the turn-up (12) to the point B at 85% of the radial height Hdc, the distance between carcass layers is at least equal to 2 and at most equal to 11 times the diameter of metal reinforcers of first carcass layer (1).

10 Claims, 1 Drawing Sheet

(58) Field of Classification Search
CPC . B60C 15/00; B60C 15/0027; B60C 15/0009; B60C 2015/009
See application file for complete search history.

(56) References Cited

U.S. PATENT DOCUMENTS

2011/0017379 A1    1/2011   Chambriard et al.
2022/0048326 A1*  2/2022   Barbarin .................. B60C 9/22

* cited by examiner

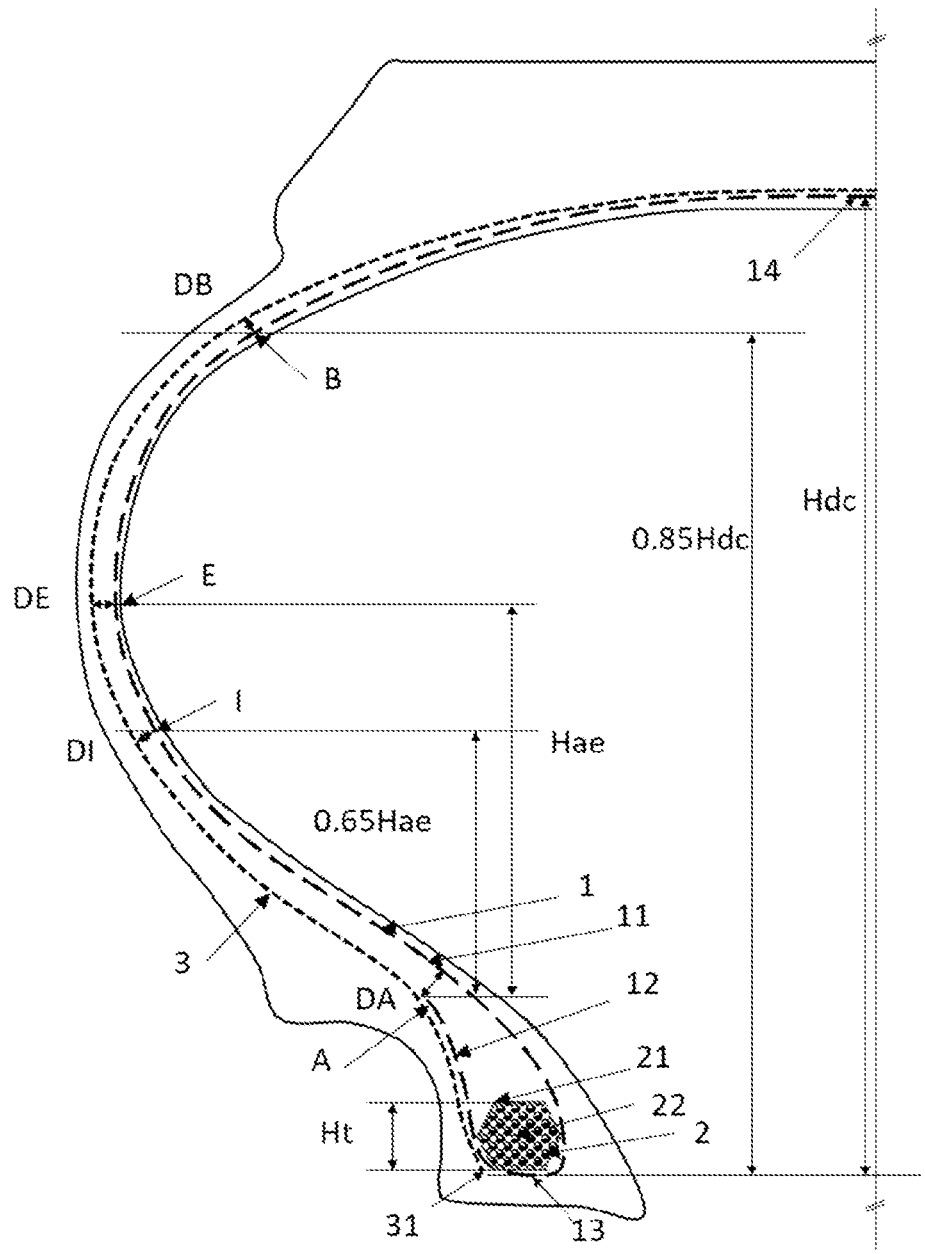

OPTIMIZED ARCHITECTURE OF A CIVIL ENGINEERING TIRE

RELATED APPLICATIONS

This is a U.S. National Phase Application under 35 USC 371 of International Application PCT/FR2022/050679 filed on Apr. 11, 2022.

This application claims the priority of French application no. FR 2103881 filed Apr. 15, 2021, the entire content of all of which is hereby incorporated by reference.

FIELD OF THE INVENTION

The subject matter of the present invention is a radial tire, intended to be fitted to a heavy-duty vehicle of civil engineering type, and more specifically the present invention relates to the carcass reinforcement of such a tire.

BACKGROUND OF THE INVENTION

Radial tires intended to be fitted to a heavy-duty civil engineering vehicle are so designated within the meaning of the European Tire and Rim Technical Organisation, or ERTRO, standard.

For example, a radial tire for a heavy-duty civil engineering vehicle, within the meaning of the European Tire and Rim Technical Organisation, or ETRTO, standard, is intended to be mounted on a rim with a diameter at least equal to 25 inches. Although not limited to this type of application, the invention is described for a radial tire of large size, which is intended to be mounted on a dumper, in particular on vehicles for transporting materials extracted from quarries or surface mines, by way of a rim with a diameter at least equal to 35 inches, possibly as much as 57 inches, or even 63 inches.

Since a tire has a geometry exhibiting symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential direction is tangential to the circumference of the tire.

In the following text, the expressions "radially inner/radially on the inside" and "radially outer/radially on the outside" mean "closer to" and "further away from" the axis of rotation of the tire, respectively. "Axially inner/axially on the inside" and "axially outer/axially on the outside" mean "closer to" and "further away from" the equatorial plane of the tire, respectively, with the equatorial plane of the tire being the plane that passes through the middle of the tread surface and is perpendicular to the axis of rotation.

Generally, a tire comprises a tread intended to come into contact with the ground via a tread surface, and the two axial ends of which are connected via two sidewalls to two beads that provide the mechanical connection between the tire and the rim on which it is intended to be mounted.

A radial tire further comprises a reinforcement made up of a crown reinforcement radially on the inside of the tread and of a carcass reinforcement radially on the inside of the crown reinforcement.

The carcass reinforcement of a radial tire for a heavy-duty civil engineering vehicle usually comprises a carcass layer comprising generally metal reinforcers, or reinforcing elements, that are coated in a polymeric material of the elastomer or elastomeric type obtained by blending and known as a coating compound. A carcass layer comprises a main part that joins the two beads together and is generally wrapped, in each bead, from the inside of the tire to the outside, around a usually metal circumferential reinforcing element known as a bead wire so as to form a turn-up. The metal reinforcers of a carcass layer are substantially mutually parallel and form an angle of between 80° and 90° with the circumferential direction.

The crown reinforcement of a radial tire for a civil engineering vehicle comprises a superposition of circumferentially extending crown layers, radially on the outside of the carcass reinforcement. Each crown layer is made up of generally metal reinforcers that are mutually parallel and are coated in a polymeric material of the elastomer or coating compound type.

The carcass reinforcement is a limiting factor that limits the use that can be made of civil engineering tires, either from the standpoint of the maximum load or from the standpoint of pressure. There is a connection between the internal pressure of the tire and its maximum load. The higher the pressure, the higher the maximum load. Moreover, the higher the pressure the stiffer the tire because it has less ability to deform in order to absorb shocks. The higher the pressure the larger the diameter of the cords of the carcass layers needs to be, bringing the outermost strands further away from the neutral axis, to the great detriment of their fatigue strength. The lower the pressure, the greater the extent to which the sidewalls deflect under load and the more bending the carcass layer is subjected to. Moreover, increasing the pressure and increasing the diameter of the cords entails the use of cords manufactured from individual threads of the larger diameter than the individual threads that are optimal for fatigue strength, this being because of the difficulty in manufacturing cords comprising a very high number of individual metal threads.

SUMMARY OF THE INVENTION

The inventors have set themselves the objective, for a radial tire for a vehicle of the civil engineering type, of increasing its load-bearing capacity by 25%, compared with its nominal load, for an inflation pressure equal to its nominal pressure, or, for the same load, of being able to reduce the inflation pressure, to a load equal to its nominal load, in order to increase the resistance to shock loading of the crown of the tire.

This objective has been achieved, according to an embodiment of the invention, by a radial carcass reinforcement tire for a civil engineering vehicle comprising:
  a crown reinforcement, radially on the inside of a tread, said tread being connected by two sidewalls to two beads,
  a carcass reinforcement extending between the two beads and made up of two carcass layers comprising metal reinforcers which, with a radial direction, make an angle of between −10° and 10°,
  a first carcass layer, the radially innermost one, being anchored in each of the beads by being turned up around a bead wire having a geometric centre and a radial height Ht, to form a main part extending from one bead wire to the other, and a turn-up, axially on the outside of the main part in each of the beads, and having a free end,
  the first carcass layer having a radial height Hdc, measured from its radially innermost point to its radially outermost point, a second carcass layer extending from one bead to the other and being radially on the outside of the first carcass layer in a crown region of the tire, the distance from the second carcass layer to the main part of the first carcass layer being measured between the neutral axes of the second carcass layer and of the main part of the first carcass layer, each free end of each turn-up of the first carcass layer in each bead being at a radial distance from the radially outermost point of the bead wire that is at least equal to 1 times and at most equal to 2 times the radial height Ht of the bead wire, in each bead, the end of the second carcass layer being radially on the inside of the geometric centre of the bead wire, in each bead, from the free end of the turn-up of the first carcass layer to the point of the first carcass layer that is distant from the radially innermost point of the first carcass layer by a radial distance equal to 85% of the radial height of the first carcass layer, the distance between the main part of the first carcass layer and the second carcass layer being at least equal to 2 times and at most equal to 11 times the diameter of the metal reinforcers of the first carcass layer, the metal reinforcers of the two carcass layers being cords made up of individual threads of which the diameters are at least equal to 0.17 mm and at most equal to 0.23 mm for at least 50% of these individual threads, and at least equal to 0.17 mm and at most equal to 0.26 mm for the entirety of these individual threads.

The embodiment consists in a radial civil-engineering tire comprising two metal carcass layers. This solution is complex to implement given the need to use metal cords in order to withstand the stresses of this type of use and the complexity in managing the fatigue strength of the carcass reinforcement notably in the bending zones of the sidewalls and of the beads. Specifically, a solution involving two carcass layers allows the sidewalls to be made to behave like a beam, with the disadvantage that the two layers lie one on each side of the neutral axis of the sidewalls. The type of stressing varies between the two carcass layers according to whereabouts they are situated on the sidewall and their bending mode. The radially innermost first carcass layer is relatively in extension and the second carcass layer is relatively in compression just above the rim flange for example. The radially innermost first carcass layer is relatively in compression and the second carcass layer is relatively in extension at the axially outermost point of the tire and at the shoulder where the sidewall meets the crown of the tire. Between these distinct zones that have a mode of operation, the stresses may be relatively evenly balanced.

Now, it is very complicated to keep a metal carcass layer performing well under compressive loading. This is why a solution involving two carcass layers, one on each side of the neutral axis, has not been considered to be feasible in heavy-duty or civil-engineering tires of a rim size greater than 19 inches. Specifically, because of the technical use to which they are put, such tires would not use in their carcass layers reinforcers other than metal reinforcers. Nevertheless and astonishingly, it is possible to carry out such an invention for civil-engineering tires thereby improving the endurance of the tire or allowing an increase in loading for the same working pressure or allowing a reduction in pressure for the same maximum load. This can be achieved because of the dimension of the cords of the single carcass layer of the tires according to the prior art. These reinforcers are of large diameter and have low flexibility, which is disadvantageous in terms of their bending strength.

According to an embodiment of the invention, the two carcass layers have reinforcers of smaller diameter which are made up of individual metal threads of a diameter comprised between 0.17 and 0.23 mm which exhibit optimized bending behaviour for this type of tire. Having two carcass layers makes it possible to reduce the diameter of the reinforcers used by 30% to 50% depending on the pitch employed for the carcass layers. Specifically, the smaller-diameter reinforcers are naturally more flexible because of the reduction in the inertia of the cross section but they can also be laid at a smaller pitch. The increased flexibility of the reinforcers according to the invention to a large extent compensates for the creation of a neutral axis between the two carcass layers, provided that the distances between the carcass layers in the sidewall are correctly dimensioned, and provided that the ends of the carcass layers are positioned in such a way as to control the risks of cracking that they incur.

A first rule is that the free end of the turn-up of the first carcass layer needs to be in a zone of the tire that is not under compression and radially on the outside of the radially outermost point of the bead wire so as to prevent the first carcass layer from unwrapping if the bead becomes overheated. The radial height of the bead wire Ht is measured on a meridian section from its radially innermost point or points to its radially outermost point or points. The free end of the turn-up of the first carcass layer needs to be at a radial distance from the radially outermost point of the bead wire that is at least equal to 1 times and at most equal to 2 times the radial height Ht of the bead wire, The end of the second carcass layer needs to be situated in a zone where, for preference, the deformations are very small if not nil. This condition is met if the end of the second carcass layer is radially on the inside of the geometric centre of the bead wire, The geometric centre of the bead wire will be considered as being the intersection of the diagonals of the smallest rectangle containing the bead wire. As a preference, the end of the second carcass layer is radially on the inside of the radially innermost point of the bead wire. As a preference, in order to prevent cracking of the rubber compounds under the bead wire, the end of the second carcass layer is axially on the inside of the geometric centre of the bead wire. As a preference, if the radially innermost points of the bead wire constitute a segment or base, it is then advantageous for the end of the second carcass layer not to be situated plumb with this base. Specifically, even though there is little movement in this zone, compression loading plumb with the base is at a maximum, especially in the middle of this base. This compression loading has the ability to destroy the end of the reinforcers of the second carcass layer. There is then a high risk that one of the individual threads will pierce through the rubber compounds to the outside of the tire, thus creating a path for the ingress of water, which can then cause the bead wire or the second carcass layer to oxidize, potentially leading to a drop in the endurance performance of the tire. It will therefore be preferable for the end of the second carcass layer to be axially on the outside of the axially outermost point of the base of the bead wire or axially on the inside of the axially innermost point of the base of the bead wire and more particularly axially on the outside or axially on the inside of the midpoint of the base of the bead wire. The configuration whereby the end of the second carcass layer is axially on the inside of the axially innermost point of the base of the bead wire has the advantage of maximizing the ability of the bead to resist the unwrapping of the carcass layers as these are pinned down by the base of the bead wire.

In order for the invention to work, it is necessary to control the distance between the two carcass layers between the free end of the turn-up of the first carcass layer and the shoulder where the sidewall meets the crown. In the case of civil-engineering tires, this shoulder is at a point situated at a radial distance from the radially innermost point of the carcass layer that is equal to 85% of the radial height of the first carcass layer Hdc, measured on a meridian section positioned to conform to a tire casing mounted on its nominal rim. In order to reduce as far as possible the problems of bending and relative position of the carcass layers relative to the neutral axis, one solution might have been to bring the two carcass layers as close together as possible, but surprisingly this solution does not afford any notable improvement. By contrast, setting the distances between the two carcass layers along the sidewall of the tire in a particular way provides a solution to the stated problem, provided that use is made of cords of smaller diameters and therefore of greater flexibility than those used for a solution comprising just one carcass layer. This condition is met with individual threads of which the diameter is comprised between 0.17 mm and 0.23 mm for at least 50% of these individual threads, and at least equal to 0.17 mm and at most equal to 0.26 mm for the entirety of these individual threads. As a preference, the metal reinforcers of the two carcass layers (1, 3) are cords made up of individual threads of which the diameters are, for at least 60% of these individual threads, at least equal to 0.17 mm and at most equal to 0.2 mm.

For a tire having a nominal pressure P, it is possible to link the diameter of the cords of the carcass layers to the size of the tire. For a carcass reinforcement made up of two carcass layers, the tire according to the invention has:
 a nominal pressure P in bar,
 a diameter d of the metal reinforcers of the carcass layers in mm,
 a radial distance R13 from the radially innermost point of the first carcass layer to the axis of rotation of the tire in mm,
 a radial distance R14 from the radially outermost point of the first carcass layer to the axis of rotation of the tire in mm,
and so, if the product Q is equal to $(R14-R13)*(3R14+R13)/8$ in mm$^2$, then the quotient $1000*d*R13/(P*Q)$ is at least equal to 0.25 and at most equal to 0.6. The lower limit allows the carcass reinforcement to be sufficiently able to withstand the internal pressure while also having sufficient fatigue strength. The upper limit makes it possible to produce tires having metal reinforcers in the carcass layers, of which the diameters are significantly smaller—between 30 and 50%—than the diameters of the cords for a single carcass layer of the tires according to the prior art. It is then possible to adjust the endurance performance by altering the pitch of the metal reinforcers. Limiting the diameter of the cords makes it possible to limit the mass of the tire and the consumption of raw material. Using cords with smaller diameters also makes it possible to make savings in terms of industrial efficiency. Specifically, these smaller-diameter cords are easier to manufacture, to cut, to handle, to lay.

Tests have shown that a performance compromise was acceptable if, between the free end of the turn-up of the first carcass layer and the point of the first carcass layer that is distant from the radially innermost point of the first carcass layer by a radial distance equal to 85% of the radial height Hdc of the first carcass layer, the distance between the first carcass layer and the second carcass layer is at least equal to 2 and at most equal to 11 times the diameter of the metal reinforcers of the first carcass layer and preferably at least equal to 3 and at most equal to 8 times the diameter of the metal reinforcers of the first carcass layer.

The distance between the two carcass layers is possibly constant from the free end of the turn-up of the first carcass layer as far as the shoulder where the sidewall meets the crown. Nevertheless, for a constant distance in this zone, certain points are more highly stressed than others and this solution is not optimal.

An improvement to the invention is achieved when the distance DA between the main part of the first carcass layer and the second carcass layer, measured at the free end of the turn-up of the first carcass layer, is greater than the distance DB between the first carcass layer and the second carcass layer, measured at that point of the first carcass layer that is distant from the radially innermost point of the first carcass layer by a radial distance equal to 85% of the radial height Hdc of the first carcass layer. Specifically, because of the presence of the rim flange which acts as a support during bending, a greater distance at the rim flange rather than at the shoulder where the sidewall meets the crown makes it possible to encourage the flattening of the crown while maintaining adequate bending stiffness of the sidewall. The risk of fatigue failure in this zone is therefore lower. As a result, it is more advantageous for the shear strength of the rubber to increase the distance separating the two carcass layers at the free end of the turn-up of the first carcass layer then at the shoulder where the sidewall meets the crown.

Another improvement to the invention is achieved, for similar reasons, when the distance DA between the main part of the first carcass layer and the second carcass layer, measured at the free end of the turn-up of the first carcass layer, is greater than the distance DE between the first carcass layer and the second carcass layer, measured at the axially outermost point of the first carcass layer. The axially outermost point of the first carcass layer is the site of maximum bending and it is here that the forces caused by the separation of the carcass layers from the neutral axis need to be reduced as far as possible.

It is also advantageous, for good distribution of the bending forces over the height of the sidewall of the tire, for the distance between the carcass layers at the axially outermost point of the first carcass layer to be similar to the distance between the carcass layers at the shoulder where the sidewall meets the crown. This condition is met if the distance DE between the first carcass layer and the second carcass layer, measured at the axially outermost point of the first carcass layer is at least equal to 0.9 times the distance DB between the first carcass layer and the second carcass layer, measured at that point of the first carcass layer that is distant from the radially innermost point of the first carcass layer by a radial distance equal to 85% of the radial height Hdc of the first carcass layer. As a preference, from the axially outermost point E of the first carcass layer to the point B of the first carcass layer that is distant from the radially innermost point of the first carcass layer by a radial distance equal to 85% of the radial height Hdc of the first carcass layer, the distance between the main part of the first carcass layer and the second carcass layer is at most equal to 1.1 times the distance DE between the first carcass layer and the second carcass layer, measured at the axially outermost point of the first carcass layer.

Between the free end of the turn-up of the first carcass layer, which bends with a centre of curvature that is on the outside of the tire, and the axially outermost point of the first carcass layer which bends about a centre of curvature situated on the inside of the tire, there is a point of weakness at which the bending stresses change sign. In order to reduce the influence on endurance of this phenomenon which occurs near the point I of the first carcass layer that is situated at a distance from the free end of the turn-up of the first carcass layer that is equal to 0.65 times the distance between the free end of the turn-up of the first carcass layer and the axially outermost point of the first carcass layer, it is appropriate to reduce the distance DI, at this point, between the two carcass layers with respect to the distances between the carcass layers at the free end of the turn-up of the first carcass layer and at the axially outermost point of the first carcass layer. In the knowledge that it is preferable for the distance between the two carcass layers at the free end of the turn-up of the first carcass layer to be greater than the same distance at the axially outermost point of the first carcass layer, it is thus advantageous for the distance DI between the first carcass layer and the second carcass layer, measured at the point I of the first carcass layer, to be less than the distance DE between the first carcass layer and the second carcass layer, measured at the axially outermost point of the first carcass layer.

For an optimal design, it is appropriate for the variation in the distance between the two carcass layers between the free end of the turn-up of the first carcass layer and the shoulder where the sidewall meets the crown to be comprised between 1.5 and 4 times the diameter of the cords of the first carcass layer. This limiting of the variation makes it possible to prevent one zone of the sidewall being particularly stiffened by beam-like behaviour while another zone is particularly supple. Specifically, a zone that is particularly supple would absorb the majority of the bending as the crown flattens and would therefore be a zone of weakness in terms of endurance. Therefore it is advantageous that the distance DA between the main part of the first carcass layer and the second carcass layer, measured at the free end of the turn-up of the first carcass layer, minus the minimum distance measured between the two carcass layers between the free end of the turn-up of the first carcass layer and that point of the first carcass layer that is distant from the radially innermost point of the carcass layer by a radial distance equal to 85% of the radial height Hdc of the first carcass layer, is at least equal to 1.5 and at most equal to 4 times the diameter of the metal reinforcers of the first carcass layer.

It is possible for the carcass layers to have different metal reinforcers, although for obvious standardization reasons it is advantageous for the metal reinforcers of the two carcass layers to be identical in terms of their components and their architectures.

BRIEF DESCRIPTION OF THE DRAWINGS

The features of the invention are illustrated in FIG. 1, which is schematic and not to scale, with reference to a tire of size 24.00R35.

DETAILED DESCRIPTION OF THE DRAWINGS

FIG. 1 depicts a meridian half section of a tire for a heavy-duty vehicle of civil engineering type, comprising a carcass reinforcement having a first carcass layer 1, the radially innermost one, anchored in each bead by being turned up around the bead wire 2, and a second carcass layer 3. The first carcass layer 1 has a main part 11 extending from the bead wire 2 to the other bead wire in the other bead and a turn-up 12 having a free end A, which is to say the radially outermost end A. The first carcass layer has a radial height Hdc, measured on a meridian section positioned as mounted on a nominal rim, between the radially innermost point 13 of the first carcass layer, which point is situated beneath the bead wire 2, and the radially outermost point 14 of the first carcass layer, which point is situated in the crown usually at the equatorial plane of the tire. At a radial distance equal to 85% of Hdc from the radially innermost point 13 of the first carcass layer 1 lies the point B at which the crown meets the sidewall. The point E designates the axially outermost point of the first carcass layer on a meridian section positioned as mounted on a nominal rim. Hae is the radial distance between the point A and the point E. The point I denotes the point on the first carcass layer that is situated at a radial distance from the point A equal to 0.65 times Hae. The points A, B, E, I are considered on the midline of the first carcass layer. Associated with each of these points is a distance D, these being respectively DA, DB, DE, DI, from the midline of the main part 11 of the first carcass layer 1 to the midline of the second carcass layer 3. The bead wire 2 has a radial height Ht, measured between its radially innermost point and its radially outermost point 21. The point 22 is the geometric centre of the bead wire, corresponding to the centre of the smallest rectangle containing the bead wire in the meridian section. The radially innermost end 31 of the second carcass layer 3 is radially on the inside of the geometric centre of the bead wire. The free end A of the turn-up of the first carcass layer is at a radial distance from the radially outermost point 21 of the bead wire 2 that is comprised between one times and two times the radial height Ht. For all points on the first carcass layer comprised between point A and point B, the distance from the first carcass layer to the second carcass layer is comprised between 2 and 11 times the diameter of the metal reinforcers of the first carcass layer. In addition, DA is greater than DE and DB, DE is at least equal to 0.9 times DB, and DI is less than DE. The variation in the distance between the two carcass layers between the point A and the point B is comprised between 1.5 and 4 times the diameter of the metal reinforcers of the first carcass layer.

The invention was tested on tires of size 24.00R35. The tires according to the invention were compared with reference tires of the same size for each of the tests.

The reference tires have a single carcass layer of which the metal reinforcers are cords of 7 strands comprising 7 steel threads of 23 hundredths of 2.24 mm in diameter and laid at a pitch of 2.6 mm under the bead wire.

The tires according to the invention comprise two carcass layers of which the metal reinforcers are cords of 27 steel threads of 18 hundredths of a millimetre, 1.38 mm in diameter and laid at a pitch of 1.8 mm. The cords of the reference tire and of the tire according to the invention are wrapped cords.

The distance DA, which is the maximum distance between the two carcass layers between A and B, is equal to 8 mm. The distance DB is equal to 4.4 mm, this being the minimum distance between the two carcass layers between the points A and B. The distance DI, which is the minimum distance between the two carcass layers between the points A and E, is equal to 5.9 mm, and the distance DE is equal to 6.4 mm. The distance between the two carcass layers between A and B is indeed comprised between 2 and 11 times the diameter of the metal reinforcers of the first carcass layer. DA-DB is indeed comprised between 1.5 and 4 times the diameter of the metal reinforcers of the first carcass layer.

The other components of the control tires and of the tires according to the invention, the crown architecture, the rubber compounds, etc. are identical.

The tires were tested on a machine. They were first of all planed down to the bottom of the tread pattern so as to concentrate the stress loadings in the sidewalls and the beads. The profile of the tread of the tire planed-down corresponding to the profile of the tread when new. Two tires were compressed against one another with a force of 25 000 daN corresponding to the nominal load plus 25% of overload at 6.2 bar of pressure namely a pressure 1.05 bar lower than the nominal pressure. The tires were run against one another at a speed of 15 km/h. The tire according to the invention sustained over 1000 h of running without damage while the tire according to the prior art was stopped after 800 h upon breakage of the rubber compounds in the sidewall.

Thus, the disclosed embodiment of the invention does indeed lead to an at least 20% improvement to the endurance performance of the sidewall and of the bead when used overloaded and underinflated.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A radial carcass reinforcement tire for a civil engineering vehicle, comprising:
    a crown reinforcement, radially on the inside of a tread, said tread being connected by two sidewalls to two beads,
    a carcass reinforcement extending between the two beads and made up of two carcass layers comprising metal reinforcers which, with a radial direction, make an angle of between −10° and 10°,
    a first carcass layer, the radially innermost one, being anchored in each of the beads by being turned up around a bead wire having a geometric centre and a radial height Ht, to form a main part extending from one bead wire to the other, and a turn-up, axially on the outside of the main part in each of the beads, and having a free end (A),
    the first carcass layer having a radial height Hdc, measured from its radially innermost point to its radially outermost point,
    a second carcass layer extending from one bead to the other and being radially on the outside of the first carcass layer in a crown region of the tire, the distance from the second carcass layer to the main part of the first carcass layer being measured between the neutral axes of the second carcass layer and of the main part of the first carcass layer,
    wherein each free end (A) of each turn-up of the first carcass layer in each bead is at a radial distance from the radially outermost point of the bead wire that is at least equal to 1 times and at most equal to 2 times the radial height (Ht) of the bead wire,
    wherein in each bead, the end of the second carcass layer is radially on the inside of the geometric centre of the bead wire,
    wherein, in each bead, from the free end (A) of the turn-up of the first carcass layer to the point (B) of the first carcass layer that is distant from the radially innermost point of the first carcass layer by a radial distance equal to 85% of the radial height (Hdc) of the first carcass layer, the distance between the main part of the first carcass layer and the second carcass layer is at least equal to 2 times and at most equal to 11 times the diameter of the metal reinforcers of the first carcass layer,
    and wherein the metal reinforcers of the two carcass layers are cords made up of individual threads of which the diameters are at least equal to 0.17 mm and at most equal to 0.23 mm for at least 50% of these individual threads, and at least equal to 0.17 mm and at most equal to 0.26 mm for the entirety of these individual threads.

2. The tire according to claim 1, wherein the distance DA between the main part of the first carcass layer and the second carcass layer, measured at the free end (A) of the turn-up of the first carcass layer, is greater than the distance DB between the first carcass layer and the second carcass layer, measured at that point (B) of the first carcass layer that is distant from the radially innermost point of the first carcass layer by a radial distance equal to 85% of the radial height (Hdc) of the first carcass layer.

3. The tire according to claim 1, wherein the distance DA between the main part of the first carcass layer and the second carcass layer, measured at the free end (A) of the turn-up of the first carcass layer, is greater than the distance DE between the first carcass layer and the second carcass layer, measured at the axially outermost point (E) of the first carcass layer.

4. The tire according to claim 1, wherein the distance (DE) between the first carcass layer and the second carcass layer, measured at the axially outermost point (E) of the first carcass layer is at least equal to 0.9 times the distance (DB) between the first carcass layer and the second carcass layer, measured at that point (B) of the first carcass layer that is distant from the radially innermost point of the first carcass layer by a radial distance equal to 85% of the radial height (Hdc) of the first carcass layer.

5. The tire according to claim 1, wherein a point I of the first carcass layer is situated at a radial distance from the free end (A) of the turn-up of the first carcass layer that is equal to 0.65 times the distance (Hae) between the free end (A) of the turn-up of the first carcass layer and the axially outermost point (E) of the first carcass layer, wherein the distance (DI) between the first carcass layer and the second carcass layer, measured at the point I of the first carcass layer, is less than the distance (DE) between the first carcass layer and the second carcass layer, measured at the axially outermost point (E) of the first carcass layer.

6. The tire according to claim 1, wherein the distance (DA) between the main part of the first carcass layer and the second carcass layer, measured at the free end (A) of the turn-up of the first carcass layer, minus the minimum distance measured between the two carcass layers between the free end (A) of the turn-up of the first carcass layer and that point (B) of the first carcass layer that is distant from the radially innermost point of the first carcass layer by a radial distance equal to 85% of the radial height (Hdc) of the first carcass layer, is at least equal to 1.5 and at most equal to 4 times the diameter of the metal reinforcers of the first carcass layer.

7. The tire according to claim 1, wherein, in each bead, from the free end (A) of the turn-up of the first carcass layer (to the point (B) of the first carcass layer that is distant from the radially innermost point of the first carcass layer by a radial distance equal to 85% of the radial height (Hdc) of the first carcass layer, the distance from the first carcass layer to the second carcass layer is at least equal to 3 and at most equal to 8 times the diameter of the metal reinforcers of the first carcass layer.

8. The tire according to claim 1, wherein the end of the second carcass layer is radially on the inside of the radially innermost point of the bead wire.

9. The tire according to claim 1, having a nominal pressure P in bar, a diameter d of the metal reinforcers of the carcass layers in mm, a radial distance R13 from the radially innermost point of the first carcass layer to the axis of rotation of the tire in mm, a radial distance R14 from the radially outermost point of the first carcass layer to the axis of rotation of the tire in mm, wherein, if the product Q is equal to $(R14-R13)*(3R14+R13)/8$ in $mm^2$, then the quotient $1000*d*R13/(P*Q)$ is at least equal to 0.25 and at most equal to 0.6.

10. The tire according to claim 1, wherein the metal reinforcers of the two carcass layers are cords made up of individual threads of which the diameters are, for at least 60% of these individual threads, at least equal to 0.17 mm and at most equal to 0.2 mm.

\* \* \* \* \*